APPARATUS FOR MAGNETIC PRINTING

Original Filed April 17, 1951 6 Sheets-Sheet 1

INVENTOR

John C. Sims Jr.

by George V. Eltgroth

Attorney

APPARATUS FOR MAGNETIC PRINTING

Original Filed April 17, 1951 6 Sheets-Sheet 2

INVENTOR

John C. Sims Jr.

by George V. Elliott

Attorney

INVENTOR
John C. Sims Jr.
by George V. Eltgroth
Attorney

INVENTOR

John C. Sims Jr.

by George V. Eltgroth

Attorney

Aug. 15, 1961 J. C. SIMS, JR 2,996,575

APPARATUS FOR MAGNETIC PRINTING

Original Filed April 17, 1951 6 Sheets-Sheet 5

INVENTOR

John C. Sims Jr.

by [signature]

Attorney

INVENTOR

John C. Sims Jr.
by George V. Eltgroth
Attorney

United States Patent Office 2,996,575

Patented Aug. 15, 1961

2,996,575

APPARATUS FOR MAGNETIC PRINTING

John C. Sims, Jr., Sudbury, Mass., assignor to Sperry Rand Corporation, New York, N.Y., a corporation of Delaware Continuation of application Ser. No. 221,362, Apr. 17, 1951. This application Apr. 27, 1960, Ser. No. 24,929

13 Claims. (Cl. 178—6.6)

Figures 1, 2, 3:
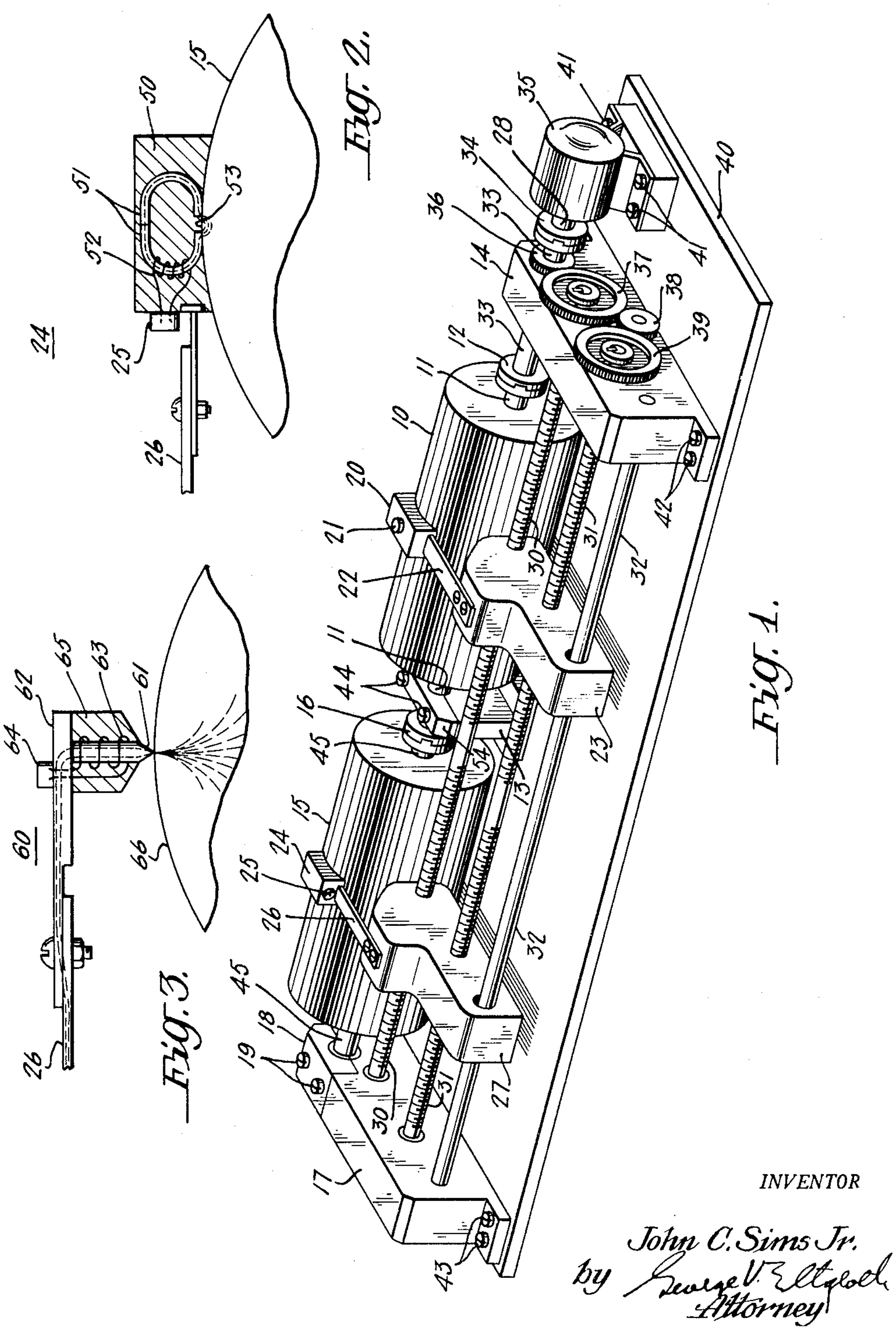

This invention relates to the art of printing and, more particularly, to a method of high speed printing utilizing magnetic principles. The present application is a continuation of application Serial Number 221,362, filed April 17, 1951, now abandoned, which application was a substitute for the abandoned original application Serial Number 143,737 filed on February 11, 1950.

In the prior art, one method of printing has been to provide means whereby elevated contacting surfaces have been used directly, or indirectly, as in the offset method, to transfer a marking substance to a receiving medium to effectuate printing. This method includes the use of pre-fabricated type faces registering letters and figures, including halftone pictorial representations, as well as moving type face printers which embrace gang printers, such as those where type is set up line by line in accordance with holes sensed on a punched paper card or tape.

The prefabrication of type faces is relatively time consuming and expensive especially when but a few printed copies are desired. Although gang printing can be used advantageously when a few printed copies are desired, its use does not extend to reproduction of pictorial representations and is seriously handicapped by the relatively great printing time needed, as well as the costliness of the equipment required.

Another well known printing process, known as facsimile, effects registration by passing electric currents through a special chemically treated paper. This technique is limited in its application to the reproduction of single printed copies, the printing time required and the cost of electro-sensitive paper consumed being excessive for high speed, low cost printing.

A recently developed process of printing makes use of a surface containing electrically charged areas, to which a printing powder will adhere until removed by a receiving medium excited with a complementary charge. The obvious disadvantages of such a procedure can be seen to be inherent in the necessity of recharging said surface area before each printing operation, and in the necessity of utilizing high electrostatic field and charging potentials. Failure of this system under conditions of high humidity is common.

Accordingly, one of the objects of the invention is to provide a new and improved method of and apparatus for printing, adapted to low cost reproduction of symbolic and pictorial representations.

Another object of the invention is to provide a new and improved method of and apparatus for printing, adapted to high speed reproduction of symbolic and pictorial representations.

Still another object of the invention is to provide a new and improved method of and apparatus for printing, adapted to allow the rapid setting up of any representations to be reproduced.

Yet another object of the invention is to provide a new and improved method of and apparatus for printing, adapted to high quantity reproduction of symbolic and pictorial representations with a single setup of such material.

A further object of the invention is to provide a new and improved method of and apparatus for printing, readily allowing unlimited changes in the representations set up for reproduction without involving a physical reformation or replacement of the intelligence-bearing material.

Still a further object of the invention is to provide a new and improved method of and apparatus for printing on untreated commercially available papers.

Yet a further object of the invention is to provide a new and improved apparatus for printing, utilizing an electronic scanning network yielding a high signal to noise ratio.

Still another object of the invention is to provide a new and improved method of and apparatus for printing, well adapted to printing intelligence derivable from an electrical signal source.

A further object of the invention is to provide a new and improved method of and apparatus for printing, adapted to selectively produce either positive or negative printed reproductions.

Another object of the invention is to provide a new and improved apparatus for printing, having high operational efficiency and simplified construction.

Yet another object of the invention is to provide a new and improved apparatus for printing, which is inexpensive to construct and has a low maintenance cost.

Still another object of the invention is to provide a new and improved method of and apparatus for printing adapted for operation without the necessary utilization of electrostatic field and charging potentials.

A further object of the invention is to provide a new and improved apparatus for printing adapted to singly satisfy all of the above stated objects.

The advantages of the invention are developed in the method of printing comprising the producing of a selected pattern of magnetic gradients over the surface of a body, causing paramagnetic particles coming into contact with said surface to be selectively retained thereon, and effecting the transfer of at least a portion of such particles to an image-receiving medium.

The paramagnetic particles may, for example, be the powder of any magnetic substance such as iron, nickel, or cobalt. Greater printing definition may be obtained by using the finer powders. However, to take full advantage of their use, it may be found necessary to admix a non-magnetic powder having larger particles, as for example those found in talcum powder, to prevent clumping of the finer magnetic particles.

The image-receiving medium, which can be ordinary paper or other material, may be wetted by a solvent to more effectively receive the printing particles, or may be sprayed with an adhesive substance to effect a like purpose and provide a permanent bond. The particles also may be fixed by treatment after they have been received on the paper, by administering a fixative at that time, by spraying.

In some instances it may be desirable to remove printing particles from a print-receiving web or sheet (textile, paper, wood, plastic, or other material can be used) after they have been transferred thereto. When that is the case, pigment-bearing particles may be used to color a paper previously sprayed with a solvent, at their points of contact therewith. Or the printing particles can be caused to react chemically to produce color at the points of contact with a paper previously sprayed with a suitable reagent. For example, a print-receiving paper can be previously treated with potassium ferricyanide, $K_3Fe(CN)_6$ to produce ferrous ferricyanide, commonly called Turnbull's blue, $Fe_3[Fe(CN)_6]_2$, by reacting with iron particles. By suitable combinations of reacting reagents and particles, a variety of printed colors may be produced. Paramagnetic particles can also be used as a catalytic agent to effect pigmentation of a reacting substance to produce similar results. The numerous other modes of effecting registration by the utilization of paramagnetic particles will be apparent to those versed in the arts of chemistry and/or printing.

Greatly diversified means can be utilized in carrying through the above described method. Although it appears desirable to utilize a body having an easily magnetizable surface for the facile production of magnetic gradients thereon, it is readily conceivable that the production of magnetic gradients can also be effected by arranging the poles of numerous small magnets to form a surface area, or by a similar arrangement of numerous small electromagnets.

Likewise the generation of magnetic gradients over a magnetizable surface is not limited to a particular scanning scheme but is susceptible of accomplishment by a great variety of means.

The transferring of particles from a magnetized surface can be accomplished by use of a contacting means, as well as by use of an attracting field or other means.

Figure 4:
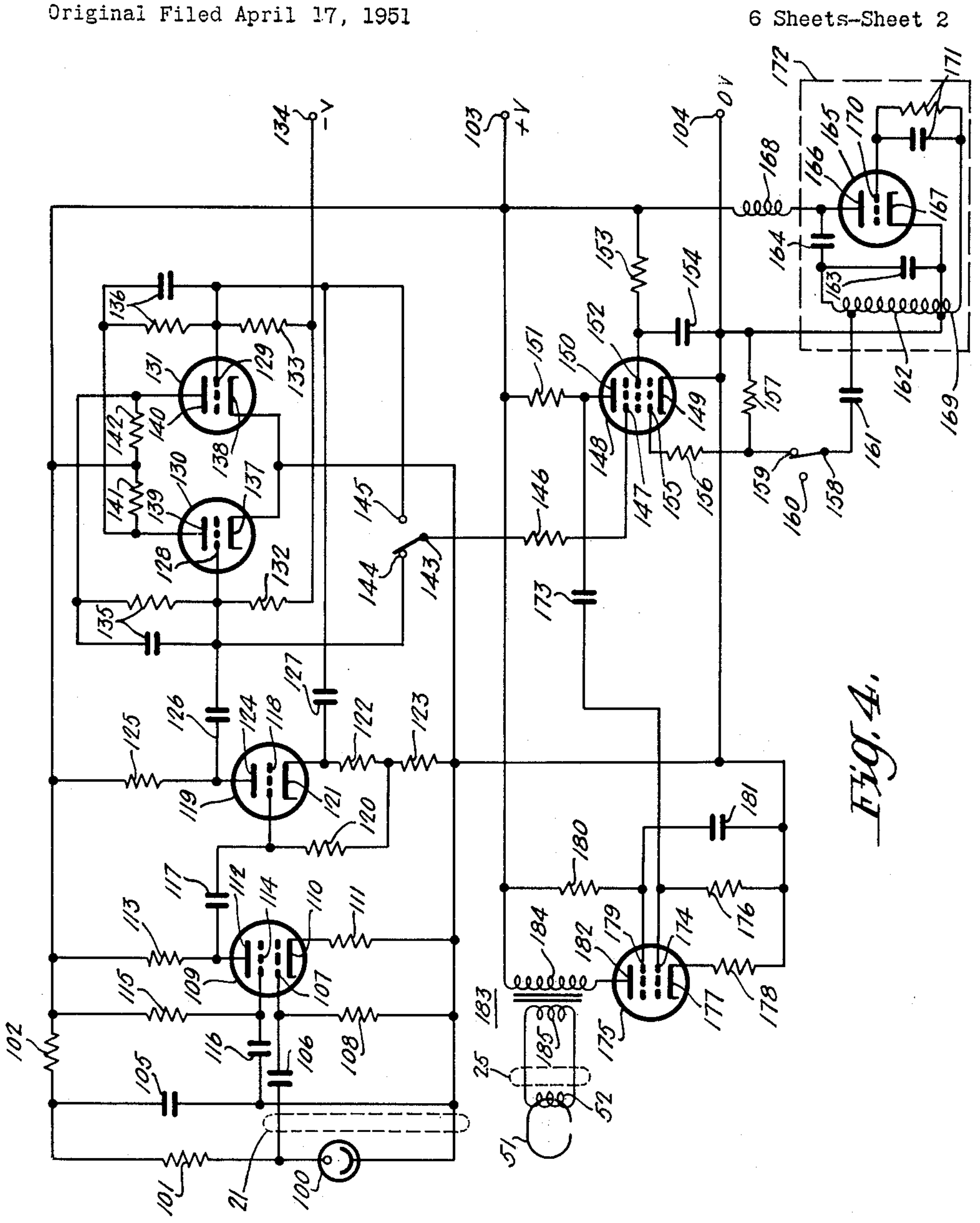
Figure 5:
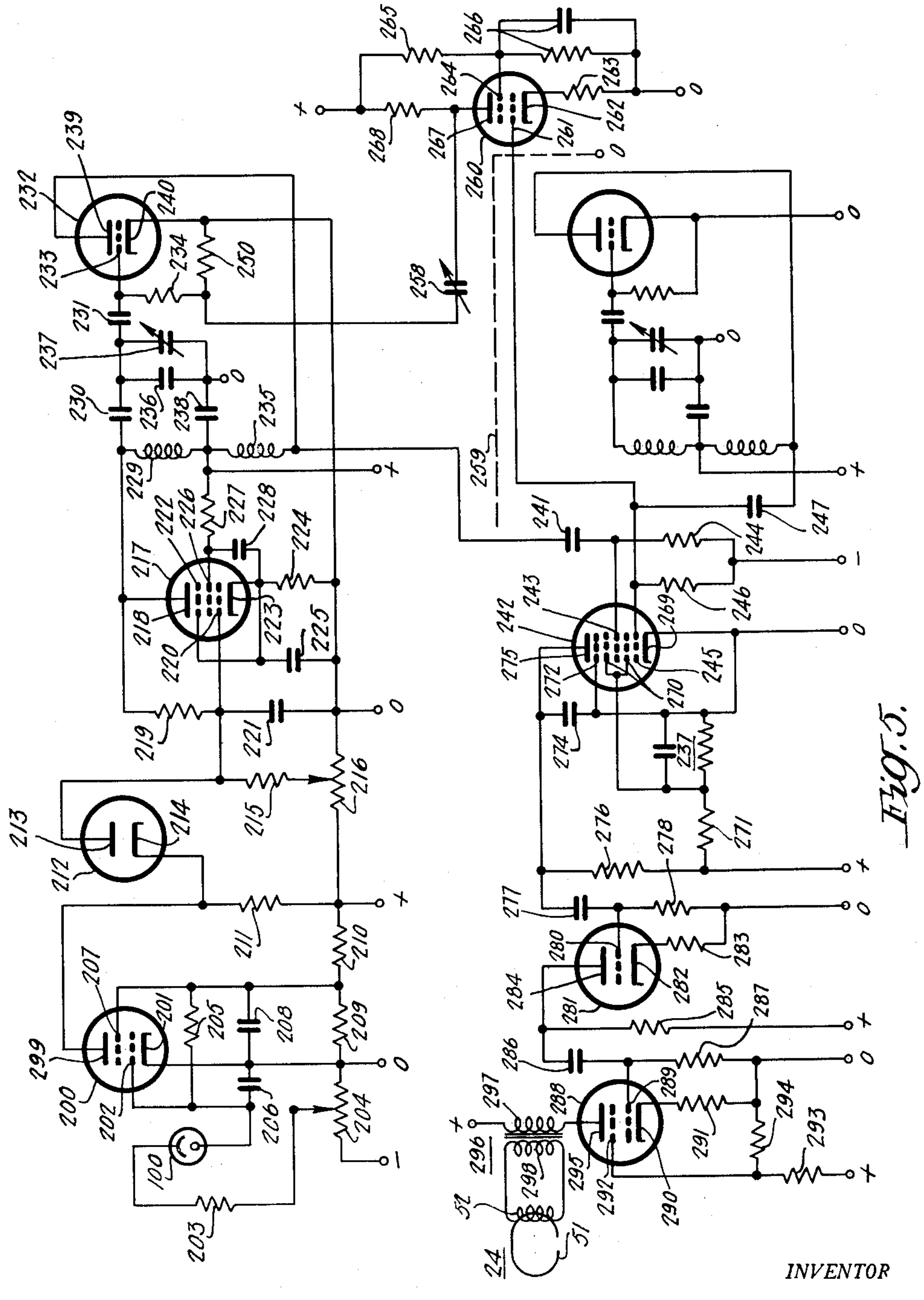
Figure 6:
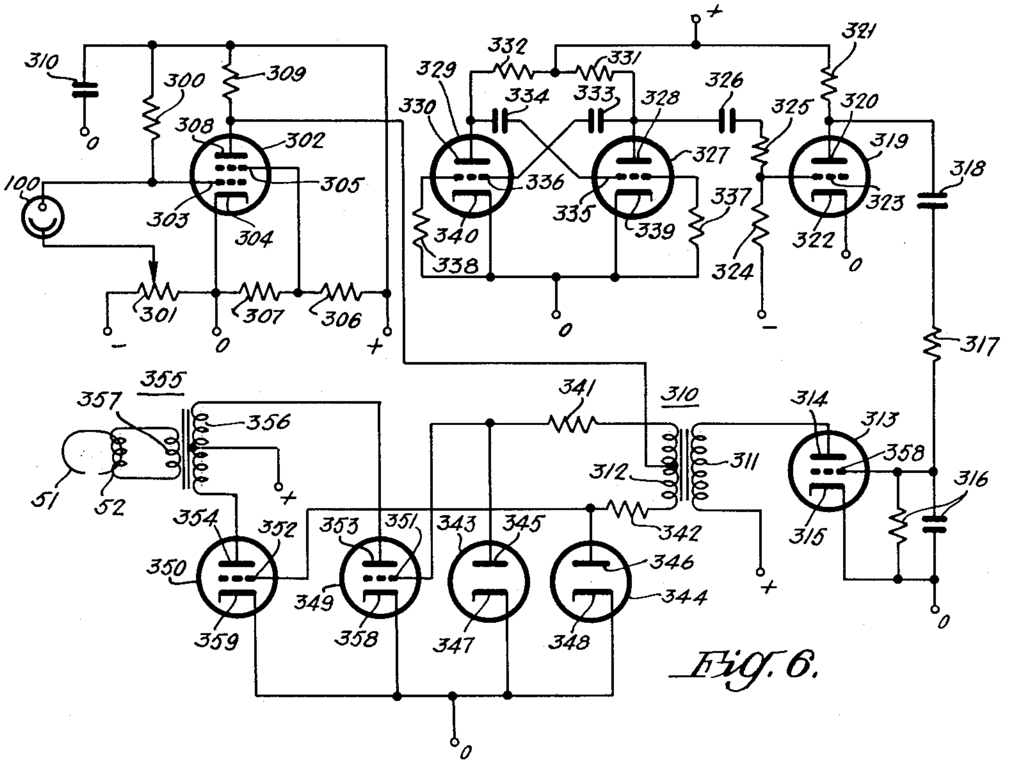
Figure 10:
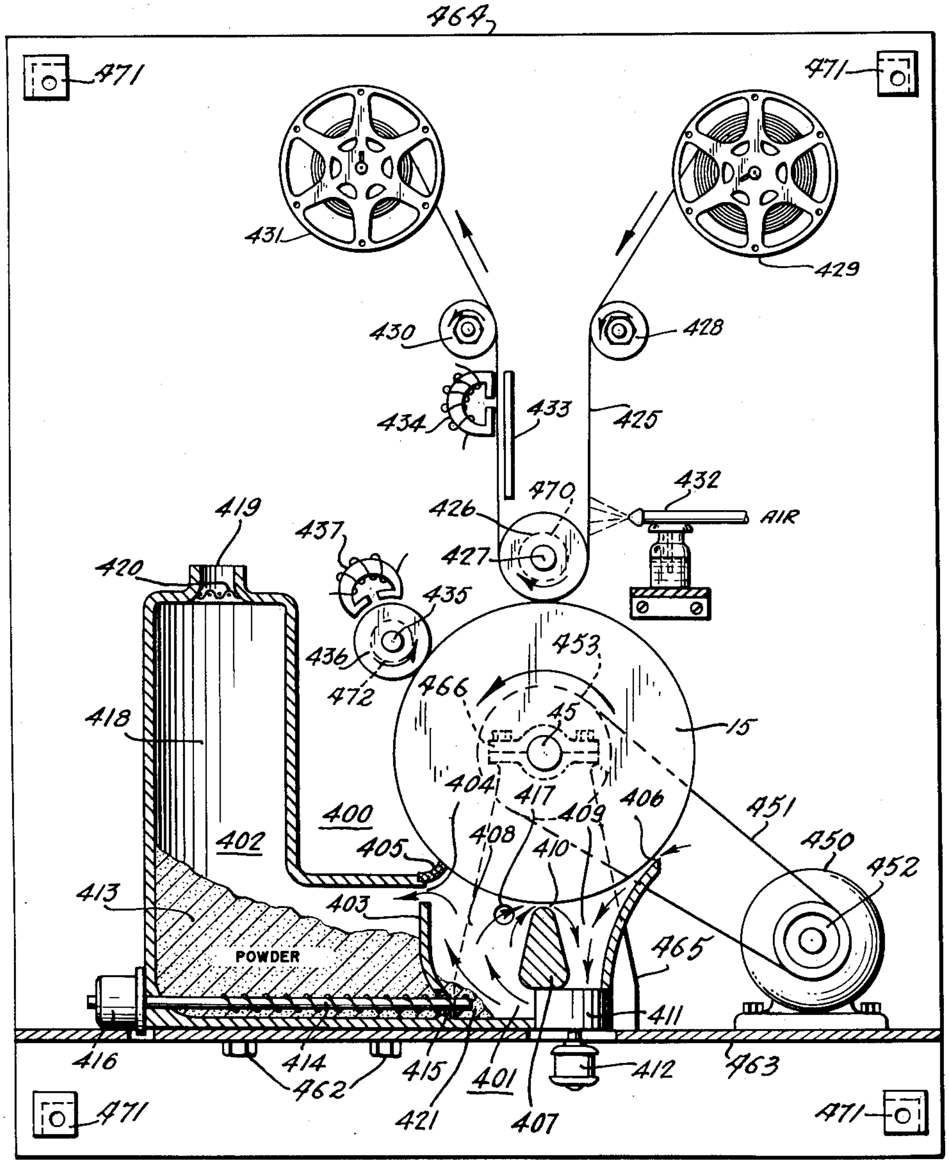
Figure 11:
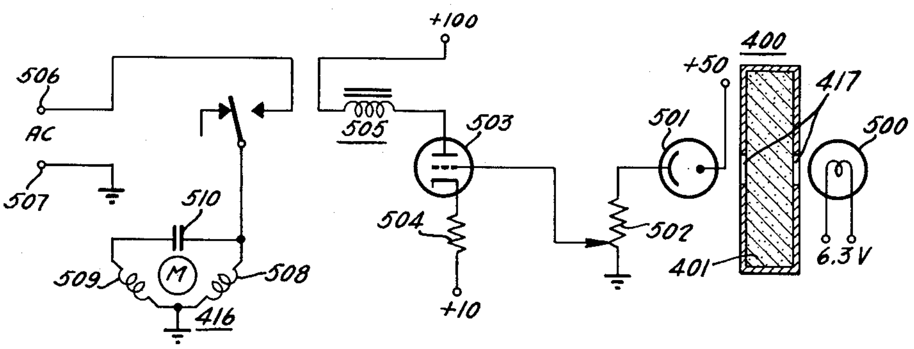
Figure 12:
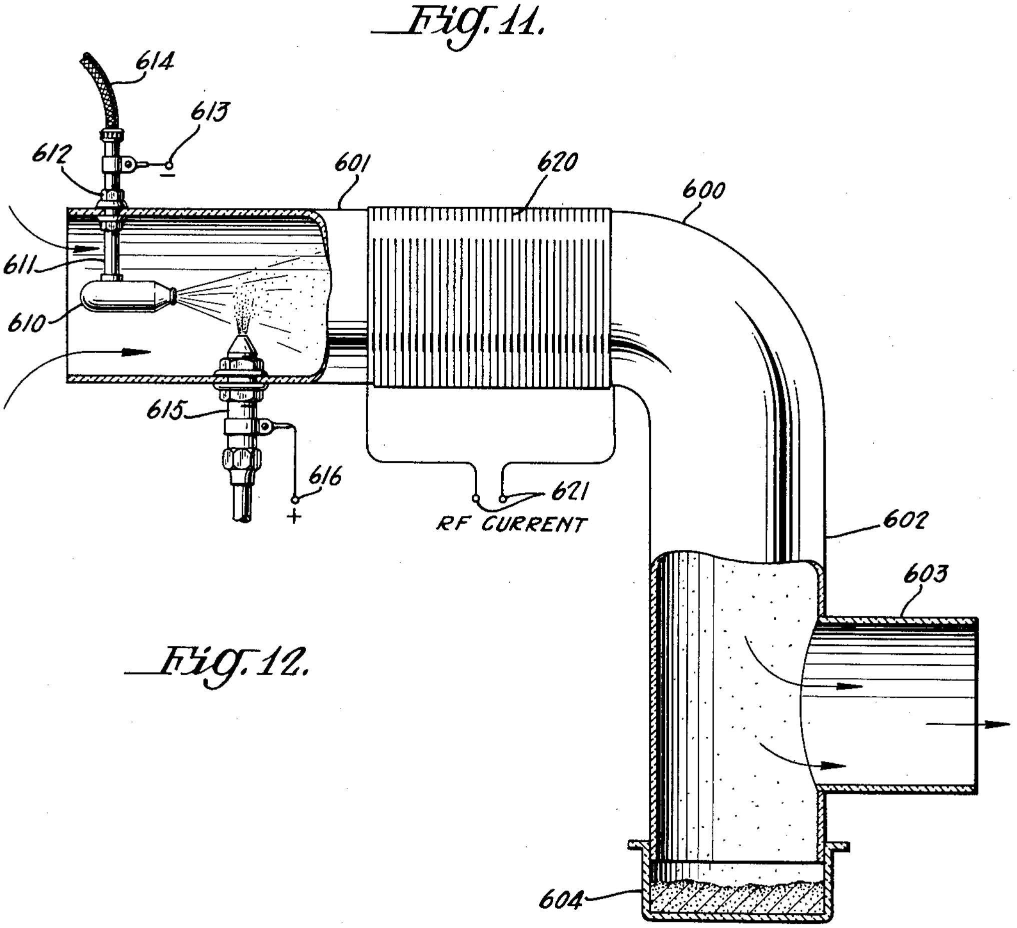

The above and further objects and aspects of the invention will become more apparent from the following detailed description taken with reference to the accompanying drawings in which:

FIGURE 1 is a perspective view of a signal scanning and setup device, being part of a printing apparatus in accordance with the present invention, FIGURE 2 is a fragmentary sectional view illustrating the construction of an electromagnetic recording head producing tangential magnetic fields, which may be embodied in the device of FIGURE 1, FIGURE 3 is a fragmentary sectional view illustrating the construction of another type of electromagnetic recording head producing substantially perpendicular magnetic fields, for use in the device of FIGURE 1, FIGURE 4 illustrates schematically an electronic signal transforming circuit used in association with the device of FIGURE 1, adapted to the scanning of screened or uni-contrast representations, FIGURE 5 illustrates schematically another electronic signal transforming circuit usable in place of the circuit shown in FIGURE 4, being adapted to the scanning of multi-contrast or halftone representations, FIGURE 6 illustrates schematically a third electronic signal transforming circuit usable in place of the circuit shown in FIGURE 5, FIGURES 7, 8 and 9 are graphic representations of signals found in various parts of the circuit illustrated in FIGURE 6, during different conditions of excitation, FIGURE 10 is a diagrammatic view, partially in section, of a printing unit, embodying the principles of the present invention, FIGURE 11 is a schematic circuit of an opacity responsive control device used in connection with the apparatus shown in FIGURE 10, and, FIGURE 12 illustrates an apparatus for producing pigment-bearing or dye-coated magnetically attractable powdered particles which are suitable for use in the apparatus shown in FIGURE 10.

Like reference characters identify like parts throughout.

Referring now to FIGURE 1 which shows the signal scanning unit, a photoscanned cylinder 10 is adapted to receive around its circular periphery a sheet of material containing representations to be reproduced in a printing process. The photoscanned cylinder 10 is supported by means of an axial shaft 11, which is connected at one extremity to a shaft coupler 12 joined to a drive shaft 33, which is rotatably mounted in an end-bearing block 14. The other extremity of axial shaft 11 is joined to a coupler 16 and is rotatably mounted in a center bearing block 13 having a removable cap 54 attached by a pair of bolts 44.

The photoscanned cylinder 10 is freely rotatable. Provision is also made for the easy replacement of said cylinder 10 by decoupling the axial shaft 11 from shaft couplers 12 and 16, and removing the cap 54 of the center bearing block 13 by means of the bolts 44.

A magnetic printing cylinder 15, which in the instant case, is similarly proportioned to the photoscanned cylinder 10, but not necessarily so, has an axial shaft 45. The said magnetic printing cylinder 15 is supported by means of the axial shaft 45 which has one extremity connected to said coupler 16, and the other rotatably supported in a split bearing of an end-bearing block 17 having a removable cap 18 attached by a pair of bolts 19.

It thus appears that the magnetic printing cylinder 15 is also rotatably mounted and easily removed by disconnecting the axial shaft 45 from the coupler 16 and removing the cap 18 of the bearing block 17 by means of the bolts 19. The coupler 16, joining the ends of the axial shafts 11 and 45, serves to synchronize the rotational motion of the photoscanned cylinder 10 and the magnetic printing cylinder 15.

The magnetic printing cylinder 15 is a body having a peripheral surface area of good magnetic quality. This may be very satisfactorily achieved by using the newly developed plating process disclosed in the U.S. Patent application of Douglas C. Wendell, Jr., and Theodore H. Bonn, entitled Electrodeposition of a Magnetic Coating, filed on January 5, 1950 under Serial No. 137,028, now Patent No. 2,644,787 granted July 3, 1953, providing for nickel-cobalt plating resulting in a surface having highly desirable magnetic properties, for instance, a coercivity of over 800 oersteds and a remanence of 10,000 gauss.

A conventional optical-electric transducer 20 comprising a photocell 100, a light source and a focussing lens, is adapted to read representations appearing upon the peripheral intelligence-bearing surfaces of the photoscanned cylinder 10 by successively sensing small areas, in a process of scanning. Proper operation may be effected when the optical-electric transducer 20 is designed to rest upon the surface of the photoscan cylinder 10 or assume a position slightly above said surface. The scanning mechanism to which said optical-electric transducer 20 is attached will be described in detail later.

The optical-electric transducer 20 has a terminal 21 which may be connected to the input of an electronic signal transforming circuit (FIGURES 4, 5, and 6) which has its output connected to the receptacle 25 of a recording head 24.

The said recording head 24 is illustrated in greater detail in FIGURE 2, where it is shown in its operating position, resting upon the magnetizable surface of the magnetic printing cylinder 15. Graphite may be used to reduce friction between the recording head 24 and the surface of the magnetic printing cylinder 15, when said cylinder is rotated. Proper operation may also be effected by positioning the said recording head 24 slightly above the surface of said magnetic printing cylinder 15.

The recording head 24 comprises a laminated core 51 made of material having a high permeability consisting of two horseshoe-shaped segments with two of their ends abutting and the other ends spaced to form a high reluctance gap 53 located adjacent to the magnetizable surface of the magnetic printing cylinder 15. The said laminated core 51 may be imbedded in an insulating material 50 as is the energizing coil 52 which is wound about a segment of the laminated core 51 and brought to a signal input terminal 25.

When the coil 52 is energized, a magnetic flux is caused to appear in the high permeability path of the laminated core 51. Because of the high reluctance gap 53 formed by said laminated core 51, the magnetic flux takes a path through the magnetizable surface of the magnetic printing cylinder 15, causing a magnetizing effect thereat related to the signal input to the energizing coil 52. In this manner, the recording head 24 is used to selectively magnetize small surface areas, and by combination with a scanning mechanism described later, may be caused to cover the surface of said magnetic printing cylinder 15 with a plurality of magnetically polarized areas corresponding to the intelligence borne by the photoscanned cylinder 10.

The recording head 24 may be used as shown, with the gap 53 in the direction of the relative motion between said head 24 and the magnetic printing cylinder 15, or with the gap oriented across or transversely of the direction of the said relative motion, the latter arrangement eliminating the need for certain auxiliary operations when solid black areas are being recorded.

FIGURE 3 illustrates in section an electromagnetic recording head 60 which may be used in place of the electromagnetic recording head 24 shown in FIGURE 2. This electromagnetic recording head 60 is comprised of a stylus-like member 61 having its nonpointed extremity connected to a head plate 62 which joins an extension arm 26; and an energizing coil 63 wound about said stylus 61 and returned to a signal input receptacle 64. Said energizing coil 63 and most of stylus 61 may be imbedded in an insulating material 65 which is shown in cross section.

The electromagnetic recording head 60 operates with the pointed end of its stylus 61 contacting the magnetizable surface of a magnetic printing cylinder 66. The friction resulting upon the motion of said magnetic printing cylinder 66 may be reduced to a minimum by using a suitable lubricant. Effective operation of the electromagnetic recording head 60 may also be accomplished by positioning the pointed end of the stylus 61 slightly above the surface of said cylinder 66.

The magnetic printing cylinder 66 which is used in combination with the electromagnetic recording head 60 differs from the magnetic printing cylinder 15 in that it is desirable that the core material of the magnetic printing cylinder 66 be characterized by a reasonably low value of coercivity and a high value of remanence. This is so because the body of the cylinder 66 is directly in the path of the magnetic flux developed by the energizing coil 63 of the electromagnetic recording head 60. The magnetic flux flows through the stylus 61 to enter the body of the magnetic printing cylinder 66 in a path substantially perpendicular to its surface, then passes through the axial shaft 45 to other magnetic flux conducting bodies, until it enters the extension arm 26 whence the magnetic circuit is completed by returning through the head plate 62 to said stylus 61. A shortened flux path may be achieved by directly returning flux entering the magnetic printing cylinder 66 through the stylus 61, by extending a flux conducting member from the electromagnetic recording head 66 contacting the printing cylinder over an extended area (thereby reducing flux density) not greatly removed from said stylus 61. In this manner, magnetic flux perpendicularly entering the surface of the magnetic printing cylinder 66 effects a result similar to that accomplished by the electromagnetic recording head 24 which utilizes a flux tangential to the surface of the magnetic printing cylinder 15, the elemental magnetic structures being normal to the surface in one case and longitudinal in the other. Although the electromagnetic recording head 24 is considered desirable, use of the electromagnetic recording head 60 may be advantageous in certain cases. For example, when head 60 is utilized, the signal scanning unit of FIGURE 1 may be used in association with a simplified electronic signal transforming circuit which need not contain a recording signal oscillator to effect recordation. This will be explained in greater detail below in connection with the discussion of the electronic signal transforming circuit shown in FIGURE 4.

Referring once more to FIGURE 1 for a description of the scanning mechanism of the signal scanning unit, the optical-electric transducer 20 is joined to a traversing block support 23 by means of a flexible springlike extension arm 22 which causes said optical-electric transducer 20 to remain in contact with the surface of said photoscanned cylinder 10. In a like manner, the electromagnetic recording head 24 is connected to another traversing block support 27 by means of an extension arm 26, maintaining said electromagnetic recording head 24 in contact with the surface of the magnetic printing cylinder 15.

The traversing block supports 23 and 27 are equally proportioned and are positioned parallel to each other by threadedly engaging a pair of parallel feeding rods 30 and 31. Each of the said feed rods 30 and 31 has a right hand thread along one-half of its length and a left hand thread along the remaining half of its length, so that when both feed rods 30 and 31 are caused to rotate in the same direction, said traversing block supports 23 and 27 will either move in a direction towards each other or away from each other. The motion of the traversing block supports 23 and 27 is controlled by a guide rod 32 which passes through openings in said block supports 23 and 27 in a direction parallel to said feed rods 30 and 31 to prevent possible jamming of the scanning mechanism.

The parallel feed rods 30 and 31 and the guide rod 32, which support the traversing block supports 23 and 27, are in turn supported by means of said end-bearing blocks 14 and 17 which receive the ends of said guide rod 32 and rotatably mount the ends of said feeding rods 30 and 31.

The end-bearing blocks 14 and 17 are each anchored to a base plate 40 by means of a set of four fastening bolts 42 and 43, respectively. A driving motor 35 is also mounted upon said base plate 40 by bolts 41 and has its shaft 28 joined by means of a motor shaft coupler 34 to the drive shaft 33. The drive shaft 33 has a drive gear 36 keyed to rotate with it. The two ends of the feeding rods 30 and 31 which protrude through the end-bearing block 14, each has a driven gear 37 and 38, respectively, keyed thereto. The drive gear 36 directly engages the driven gear 37; and an idler wheel 38 is positioned between the driven gears 37 and 39 to mesh with each.

To effectuate scanning in the signal scanning unit, the driving motor 35 is energized; its rotational motion is transmitted to the photoscanned cylinder 10 and the magnetic printing cylinder 15, which are coupled together by means of the synchronizing coupler 16. Simultaneously, motion is conveyed by means of the drive gear 36 to the driven gears 37 and 39, which are coordinated and caused to revolve in the same direction by means of the idler wheel 38. When the feed rods 30 and 31 rotate, the resulting motion of the traversing block supports 23 and 27, moving toward or away from each other, causes the optical-electric transducer 20 and the electronic recording head 24 to traverse the lengths of their respective cylinders 10 and 15 in opposite directions, while said cylinders 10 and 15 revolve under them. In this manner, both the photoscanned cylinder 10 and the magnetic printing cylinder 15 are correspondingly scanned by the optical-electric transducer 20 and the electromagnetic recording head 24, respectively.

It should be noted that the scanning path can be changed to increase or decrease the fineness of scan by varying the ratio of the diameters of drive gear 36 to driven gear 37 or 39, and, to some extent, by varying the thread pitch of the feed rods 30 and 31.

It should also be obvious to those skilled in the art, that this signal scanning unit may easily be adapted to scan the cylinders 10 and 15, each at a different rate, and that each cylinder need not revolve at the same speed, nor be equally proportioned.

For example, the cylinders 10 and 15 may be scanned at different rates by appropriately varying the pitch of the threaded portions respectively associated with the blocks 23 and 27 of the rods 30 and 31. Furthermore, the rate of angular rotation of the cylinders 10 and 15 may be varied with respect to each other by substituting for the direct coupling unit 16 a conventional angular rotation converting unit such as a gear reduction chain between the cylinders 10 and 15. Likewise, the diameter of the cylinder 10 may be larger or smaller than the diameter of the cylinder 15. Such modifications are obvious to those skilled in the art.

The cylinders 10 and 15, in the instant case, are scanned in opposite directions so that the configuration produced upon the magnetic printing cylinder 15 will be a mirror image of the scanned representation upon the photoscanned cylinder 10. This is done for the purpose of achieving a printed representation which reproduces the original scanned on cylinder 10. This will be apparent from FIGURE 10, which diagrammatically shows the magnetic printing unit including the magnetic printing cylinder 15.

The signal scanning unit may be advantageously supplied with limit switches to turn off the driving motor 25 when the traversing block supports 23 and 27 have reached their end positions in scanning process.

It is estimated that a scanning speed of 100,000 spots per second is feasible with the signal scanning and transfer unit here described, whereas speeds from 5,000 to 10,000 spots per second measure the operating limitations, of present day purely optical facsimile devices.

FIGURE 4 illustrates schematically an electronic signal transforming circuit used in association with the signal scanning and transfer unit of FIGURE 1 and includes the photocell 100 of the optical-electric transducer 20 as well as the laminated core 51 and the energizing coil 52 of the recording head 24. The recording head 60 may be used in place of 24, in FIGURES 4, 5, or 6.

The photocell 100 has its cathode connected directly to a potential of zero volts at a terminal 104, and its anode connected through series resistors 101 and 102 to a suitable positive potential at a terminal 103. A filtering capacitor 105 is connected in parallel with said series connected photocell 100 and resistor 101. The anode of said photocell 100 is also coupled by means of a capacitor 106 to the signal input grid 107 of the photocell coupling valve 109; said signal input grid 107 being returned to zero potential at terminal 104 by means of a grid resistor 108. The photocell coupling valve 109 has its cathode 110 returned to a zero potential at terminal 104 by means of a cathode resistor 111, its screen grid 114 returned to the positive potential terminal 103 through a resistor 115 and linked to the zero potential terminal 104 through a bypass capacitor 116, its anode 112 returned to the positive potential terminal 103 through the anode resistor 113 and coupled to the control grid 118 of a split load amplifier valve 119 by means of the coupling capacitor 117.

In operation, the photocell 100, which is light-sensitive, receives light impulses from the object being scanned on the photoscanned cylinder 10 and responds by changing its conductivity. The light source may be incorporated in the head 20, using any conventional configuration. Upon receipt of a light impulse the voltage drop across the photocell 100 decreases causing the transmittal of a negative voltage impulse to the signal input grid 107 of the photocell coupling valve 109. Said negative impulse results in a positive amplified signal being placed upon the control grid 118 of the split load amplifier valve 119.

The said split load amplifier valve 119 has its control grid 118 and its cathode 121 respectively returned, by means of a grid resistor 120 and a cathode resistor 122, through a series load resistor 123 to the zero potential terminal 104. The said cathode 121 is connected to control grid 129 of a triode 131 in a flip-flop circuit by means of a coupling capacitor 127; the anode 124 is likewise connected to the control grid 128 of the remaining triode 130 of said flip-flop circuit by means of the coupling capacitor 126. Said anode 124 receives a positive potential through an anode load resistor 125 joined to the positive potential terminal 103.

The triodes 130 and 131 of said flip-flop circuit have their anodes 139 and 140 respectively connected, by means of anode resistors 141 and 142, to said positive potential terminal 103, and each is respectively cross-connected to the control grids 129 and 128 by means of associated parallel resistor-capacitor combinations 136 and 135. The cathodes 137 and 138 are directly linked to the zero potential terminal 104; the control grids 128 and 129 are supplied with negative bias by being returned respectively through grid resistors 132 and 133 to a negative potential terminal 134. The control grid 128 is joined to the terminal 144 and the control grid 129 is joined to the terminal 145 of a reversing switch 143 which has its selecting arm coupled by means of the resistor 146 to the second control electrode 147 of a signal gating valve 148.

When a positive signal voltage appears upon the control grid 118 of the split load amplifier valve 119, the increased current flow therethrough causes the cathode 121 to become more positive and the anode 124 to become more negative. The positive-going pulse on the cathode 121 is transmitted to the control grid 129 to cause the valve 131 to become conductive, while the negative-going impulse upon anode 124 is transmitted to the control grid 128 of valve 130 to cause this triode to become nonconductive. This state of the flip-flop circuit is maintained until a positive impulse is delivered to the control grid 128 and a negative impulse is delivered to the control grid 129, as when the control grid 118 receives a negative-going impulse from the photocell coupling valve 109. The reversing switch 143 serves to select the source of the signal appearing upon the second control grid of the gating valve 148.

The first control electrode 155 of said gating valve 148 is coupled to a tap on an oscillator coil 162 in an oscillator circuit, isolated by means of a shield 172, through a resistor 156 and a signal output switch 158 contacting terminal 159 in series with a coupling capacitor 161. The oscillator coil 162 connected in parallel with a tuning capacitor 163, has a tap near one end directly connected to the zero potential terminal 104, and its other end coupled by means of a capacitor 164 to the anode 166 of an oscillator valve 165. The cathode 167 of said oscillator valve 165 is directly linked to the zero potential terminal 104, the anode 166 being returned to the positive potential terminal 103, by means of an anode inductor 168. The control grid 170 is connected to feedback coil 169 through a parallel resistor-capacitor combination 171.

The gating valve 148 has its first control electrode 155 returned to the zero potential terminal 104 through the series connected resistors 156 and 157, its cathode 149 directly returned to the zero potential terminal 104, its screen electrode 152 returned to the positive potential terminal 103 through a resistor 153 and returned to the zero potential terminal 104, its screen electrode 152 returned to the positive potential terminal 103 through a resistor 153 and returned to the zero potential terminal 104 by means of a by-pass capacitor 154, and its anode 150 returned to the positive potential terminal 103 through an anode resistor 151 and connected to the control grid 174 of a power output valve 175 by coupling capacitor 173.

Signals are not passed by the signal gating valve unless a positive gating signal is present upon the second control electrode 147. When a positive gating signal appears upon the second control electrode 147 of the signal gating valve 148, and the oscillator signal output switch 158 is contacting terminal 159, the oscillatory signals generated in the said oscillator circuit are passed through the gating valve 148 to appear upon the control electrode 174 of the said power valve 175. If the oscillator output switch 158 is in the off position, contacting terminal 160, a single impulse of duration controlled by the various time constants, is transmitted each time said gating valve 148 becomes conductive or nonconductive due, respectively, to the appearance of a positive or negative signal upon the second control electrode 147.

The control electrode 174 of the said power output valve 175 is returned to the zero potential terminal 104 through a grid resistor 176; the cathode 177 is likewise returned through a cathode resistor 178; the screen grid 179 is maintained at a positive potential by connection through a resistor 180 to the positive potential terminal 103 and to the zero potential terminal 104 by means of a bypass capacitor 181. The anode 182 is connected to the positive potential terminal 103 through the primary coil 184 of a signal output transformer 183, which has its secondary winding 185 connected to the head coil 52.

Signals passed by the signal gating valve 148 appear upon the control electrode 174 of the power output valve 175. These signals are amplified and delivered to the signal output transformer 183 and thence to the head coil 52 for purposes of magnetic recording as previously related.

The reversing switch 143 is useful when it is desired to make either positive or negative reproductions of the intelligence being scanned. This is so because a positive potential will appear upon terminal 144 when a negative potential appears upon terminal 145, and a negative potential will appear upon terminal 144 when a positive potential appears upon terminal 145. Thus, by selecting the proper terminal 144, or 145, a positive or negative reproduction, respectively, may be achieved.

At the same time, it may be desirable to modify the scanner drive arrangements, so that when a positive is to be produced from a positive, or a negative from a negative, the scanning heads move in the same direction, rather than in opposing directions as shown in the illustrative arrangement of FIGURE 1, which latter is suited for the production of positives from negatives, or the production of negatives from positives. Obvious mechanical structural modifications will suffice for this purpose. If desired, these modifications may be accomplished by simple, lever actuated changeover mechanisms, alternatively engaging one or another of reversely threaded feed drives, and this, in turn, may be interlocked with the action of switch 143.

The oscillator circuit including valve 165 is useful when material which has not been previously screened is being scanned by the photocell 100. This is so because, when a dark area is being scanned for positive magnetic recordation, a magnetic pole will be created when scanning passes from a white area to a black area, with the second pole appearing when passing from the black area to a white area. In the reproduction process, paramagnetic particles are used, which are attracted to different degrees to the surface of the magnetized drum. Since such particles are attracted most strongly in the regions of maximum gradient, they would cluster only at the two poles. Thus, only the outlines of the dark area would be defined by the particles so attracted. By recording impulses derived from said oscillator when black areas are scanned, magnetically attractable particles can be evenly distributed over a magnetized recording area corresponding to a black scanned area, by virtue of the numerous pole pairs generated.

The utility of the electronic signal transforming circuit shown in FIGURE 4 is limited to high contrast representations, such as characterizations represented in black and white. The contrast must also be sufficient, so that, when passing from a dark to a light area or from a light to a dark area, a sufficient impulse is transmitted to trigger the flip-flop circuit comprised of valves 128 and 131 from one of its two states to its other state. The circuit elements may be adjusted so that said circuit will be sensitive to a given change in light intensity received by the photocell 100. Other electronic signal transforming circuits will hereinafter be discussed which are capable of recording not only black and white contrast, but intermediate contrasting shades.

In this connection, the use of recording head 60 in place of recording head 25 is of interest, for this permits the elimination of the oscillator, signal gating circuit and controlling flip-flop without substantial impairment of the system's ability to reproduce extended black areas. As has already been pointed out, the paramagnetic particles are attracted to the magnetic poles. With the magnetizing field normal to the cylinder surface, only the poles are exposed, so that it becomes unnecessary to periodically interrupt the head-exciting current to insure the presence of the attracting magnetic gradients. Likewise, the pole strength is susceptible to graduated variation, so that continuously varying contrast ranges may be achieved in the absence of the oscillator, signal gating circuit and controlling flip-flop, within the limits of the time constants of the associated circuit elements.

An electronic signal transforming circuit, which is also useful in association with the signal scanning unit of FIGURE 1, is shown in FIGURE 5. The anode of the photocell 100 connects through a series resistor 205 to the junction point of voltage dividing resistors 210 and 209, respectively, connecting to a positive potential source and a zero voltage potential source. The anode of said photocell 100 is also connected with the cathode 201 through a small capacitor 206 which may comprise distributed capacity; the photocell cathode is connected in series with a resistor 203 to the contact arm of a potentiometer 204, which connects between zero voltage potential and a negative voltage potential. The photocell coupling valve 200 has its control electrode 202 directly connected to the cathode of photocell 100, its cathode 201 directly joined to a potential of zero volts, its screen grid 207 connected to the junction point of voltage dividing resistors 210 and 209 and bypassed to the cathode 201 by capacitor 208, and its anode 299 returned to a positive potential through the anode resistor 211.

A threshold control valve 212 has its cathode 214 directly linked to the anode 299 of said photocell coupling valve 200, and its anode 213 connected to the control electrode 220 of a reactance valve 217 and through an anode resistor 215 to a tap on a potentiometer 216, which is connected from a zero voltage potential to a positive voltage potential.

The photocell 100 becomes more conductive with increasing light intensity. The more conductive the photocell 100 is, the less positive becomes the potential on the control grid 202 of the photocell coupling valve 200; the less conductive the photocell 100 becomes, the more positive is the voltage upon the control grid 202. The potentiometer 204 may be adjusted to bias the control grid 202, so that the signal output from the photocell coupling valve 200 is proportional to the light intensity sensed by the photocell 100. The voltage appearing upon the anode 299 of the photocell coupling valve 200 swings negatively as the light intensity received by the photocell 100 decreases.

The threshold signal which will be passed by the threshold control valve 212 can be adjusted by means of the potentiometer 216, which determines the positive voltage upon the anode 213 of said threshold control valve 212. Thus, signals will only be passed when the cathode 214 is more negative than the anode 213, which means that light intensity sensed by the photocell 100 must be less than a given value before the signal control electrode 220 of the reactance valve 217 will be affected.

The reactance valve 217 has its screen electrode 226 returned to a positive voltage potential through a resistor 227 and linked to the cathode 223 by means of a by-pass capactior 228; its suppressor grid 222 is directly joined to the cathode 223, which is returned to zero potential by means of parallel resistor 224 and capacitor 225; its anode 218 is connected by means of a resistor 219 to the said control electrode 220, which is returned to ground by means of a phase-shifting capacitor 221. The anode 218 of said reactance valve 217 is joined to a positive voltage potential by being connected to the upper half 229 of an oscillator coil, which has its center tap connected to a positive potential and by-passed by a capacitor 238 to a zero potential source. The anode end of the oscillator coil 229 is linked to the control electrode 233 of a variable frequency oscillator valve 232 by means of series coupling capacitors 230 and 231. The junction point of coupling capacitors 230 and 231 is connected to the ground bus by a fixed tuning capacitor 236 connected in parallel with the variable tuning capacitor 237. The control electrode 233 of said variable frequency oscillator valve 232 is returned to its cathode 240 by means of series connected resistors 234 and 250; the cathode 240 is directly linked to zero potential; and the anode 239 is excited from a positive potential through the lower half 235 of said center-tapped oscillator coil, and is connected to the second signal control electrode 243 of a signal-converting valve 242 by means of a coupling capacitor 241.

The reactance valve 217 is effectively connected across one-half of the oscillator coil 229, having a given reactive effect determinative of the signal frequency generated by the variable frequency oscillator valve 232. The variable tuning capacitor 237 may be used to determine the frequency of oscillation when the reactance valve 217 receives no signal from the photocell 100. When the threshold control valve 212 passes signals to the control electrode 220 of the reactance tube 217, the reactance across the half of the oscillator coil 229 is caused to vary thereby changing the frequency generated by the variable frequency generator. The change in the frequency generated is dependent upon the change in voltage at the control electrode 220 of the reactance tube.

The said signal converting valve 242 has its first signal control electrode 245 connected by means of a coupling capacitor 247 to a beat frequency oscillator identical with the variable frequency oscillator just described, with the exception that it is not associated with a reactance valve. The said beat frequency oscillator is isolated electrically by means of a shield 259 which is connected to zero potential.

The output signal from the beat frequency oscillator is in part delivered to said variable frequency oscillator by means of a synchronizing control valve 260, which has its control electrode 261 connected to the coupling capacitor 247, its cathode 262 returned to zero potential by means of a cathode resistor 263, its screen electrode 264 connected through a resistor 265 to a positive potential voltage and through a parallel resistor and capacitor combination 266 to a zero potential source; its anode 267 is returned to a positive potential source through an anode resistor 268 and is connected to the junction point of grid resistors 234 and 250, by means of a variable coupling capacitor 258.

The function of the synchronizing control valve 260 is to introduce into the variable frequency oscillator a signal generated in the beat frequency oscillator for the purpose of locking said variable frequency oscillator with the beat frequency oscillator, when the natural generated frequencies of said oscillators do not differ greatly. The natural frequency difference beyond which the oscillators will not lock in, is determined by the amount of lock-in signal delivered to the variable frequency oscillator, which amount can be adjusted by the variable coupling capacitor 258. The said synchronizing circuit is useful for the reason that it is desirable to have the variable frequency oscillator track with the beat frequency oscillator when the reactance valve 217 is not activated by the photocell 100. Its usefulness is evident although the frequency of the variable frequency oscillator may be manually adjusted by means of the variable tuning capacitor 237, because its operation is to produce an effect which is substantially the equivalent of constantly adjusting said capacitor 237 for the smallest deviations in the oscillator frequencies caused by slight and irregular changes in the oscillator components over a time period. The said synchronizing control circuit, also acts like a threshold control, because of the adjustability of the difference in oscillator frequencies necessary before said oscillators will not lock in any longer; this is an effect which is additive to that of said threshold control circuits associated with valve 212.

The first control electrode 245 and the second control electrode 243 of said signal converting valve 242 are each negatively biased by being respectively returned by grid resistors 246 and 244 to a negative voltage potential; the cathode 269 is directly returned to a potential of zero volts; the screen electrode 270 is returned to a positive voltage potential through a resistor 271; and the suppressor electrode 272 is returned to a positive voltage potential by means of a resistor-capacitor combination 237 connected in series with said resistor 271. The suppressor electrode 272 is linked by means of a by-pass capacitor 274 to the anode 275, which is returned to a positive potential by means of an anode resistor 276. The said anode 275 is also coupled to the control electrode 280 of a signal amplifier valve 281 by means of a coupling capacitor 277.

The signal converting valve 242 receives signals generated by the reference frequency oscillator on its first signal electrode 245 and signals generated by the variable frequency oscillator on its second signal electrode 243, which results in a signal output appearing as a voltage drop across the anode resistor 276 equal to the difference in the frequencies appearing upon said first and second signal control electrodes 245 and 243. This is so because the frequencies equal to the sum of the signal frequencies appearing on the first and second signal control electrodes 245 and 243, and frequencies equal to the signal frequencies appearing upon said electrodes are by-passed by means of the capacitor 274 and the capacitance of combination 237, as well as the distributed capacitance of the signal converting valve 242. Thus the only time that a signal will appear across the anode resistor 276 is when the frequencies appearing upon the first and second control electrodes 245 and 243 are not the same; and the frequency of said signal output is equal to the difference between the frequencies upon the said first and second signal control electrodes 245 and 243.

The control grid 280 of signal amplifier valve 281 is returned to zero potential through a grid resistor 278; the cathode 282 is returned to zero potential through a cathode resistor 283; and the anode 284 is returned to a positive potential through the anode resistor 285, and is coupled to the control grid 289 of a power amplifier valve 288 by means of a coupling capacitor 286.

The said control electrode 289 of the power output valve 288 is returned to zero potential by means of a grid resistor 287; the screen grid 292 is joined to the junction point of two dividing resistors 294 and 293, respectively connecting to a zero potential source and a positive potential source. The anode 295 of said power output valve 288 is returned to a positive potential through the primary winding 297 of an impedance matching transformer 296 which has its secondary winding 298 connected to the energizing coil 52 of the electromagnetic recording head 24.

The alternating current signal appearing across the anode resistor 276 is delivered to the signal control electrode 280 by means of the coupling capacitor 277, and amplified by the signal amplifier valve 281 which drives the power output valve 288. As already described, the signal output from the power output valve 288 is used to activate the energizing coil 52 which results in magnetically effecting a magnetically susceptible surface.

It may now be noted that for all values of light intensity below a given determined value, dependent upon the adjustment of the threshold control rheostat 216 and the synchronizing control capacitor 258, the magnetic recording frequency will be directly proportional to the darkness of the area being scanned by said photocell 100. Tangential recording as effected by recording head 24 places two magnetic poles upon the magnetic printing cylinder 15 for each recording pulse, the distance between said poles decreasing with the increase of pulse frequency resulting in a greater concentration of magnetic poles and increased density of magnetic particles on the work surface. When recording head 60 is employed for perpendicular magnetic recording a flux-frequency characteristic may be utilized which, with increasing signal frequency proportionally increases the intensity of flux entering the magnetic printing cylinder, or the tuning of the reference oscillator may be displaced to cause the beat frequency to increase with increasing light intensity, making use of the natural tendency of recording head flux to decrease with increasing frequency. Because the density of and the amount of attractable particles attracted by a magnetically polarized surface can thus be made dependent upon the recording frequency, it is possible to print in a plurality of shades intermediate between black and white by the utilization of the instant electronic signal transforming circuit. The proper adjustment of the threshold control depends upon the clarity of the material being scanned. The threshold control provides for better reproduction by reducing the sensitivity of the circuit as when the scanned material has an undesirable noise background, as would result from a soiled or dirty background. An advantage is also noted in that by use of frequency modulation, a greater signal to noise ratio is obtained by virtue of the inherent qualities of this circuit.

The electronic signal transforming circuit illustrated in FIGURE 6, which can also be used in association with the signal scanning unit of FIGURE 1, results in constant frequency magnetic recordation accomplishing gradations in shade between black and white by varying the work cycle; in other words, changing the size of magnetically polarized spots upon the magnetically susceptible surface area.

The photocell 100 has its anode returned to a positive voltage potential through the series resistor 300 and its cathode returned to the contact arm of a potentiometer 301, which is connected from a source of zero potential to a negative potential. A filter capacitor 310 is connected from said positive voltage source to said source of zero potential. A photocell coupling valve 302 has its control electrode 303 directly connected to the anode of said photocell 100, its cathode 304 directly connected to zero potential, its screen grid 305 connected to the junction point of two voltage dividing resistors 306 and 307, respectively connected to a positive voltage potential and a zero voltage potential, and its anode 308 connected by means of an anode resistor 309 to a positive voltage potential and directly linked to the center tap of the secondary winding 312 of a signal input transformer 310.

The conductivity of the photocell 100 being substantially proportional to the light intensity sensed by it delivers a negative-going signal to the control grid 303 of the photocell coupling valve 302 as it becomes more conductive. This results in a positive-going signal on the anode 308, which is delivered to the center tap of the secondary coil 312 of the input signal transformer 310. Thereby the positive voltage delivered to the said center tap is related to the light signal intensity read by the photocell 100, becoming greater as the light intensity increases.

The primary winding 311 of said signal input transformer 310 has one end connected to a positive voltage potential and the other joined to the anode 314 of a signal integrating valve 313, which has its cathode 315 directly joined to zero potential and its control grid returned to zero potential through the parallel resistor-capacitor combination 316. Said control electrode 358 is joined through a resistor 317 connected in series with a coupling capacitor 318 to the anode 320 of a multivibrator coupling valve 319.

Said multivibrator coupling valve 319 has its cathode 322 directly linked to zero potential, its anode 320 returned to a positive voltage potential through an anode resistor 321, and its control electrode 323 negatively biased by means of returning a grid resistor 324 to a negative voltage potential.

The control grid 323 of said multivibrator coupling valve 319 is linked by means of a resistor 325 in series with a coupling capacitor 326 to the anode 328 of the valve 327 in a multivibrator circuit, which also contains the valve 329. Each multivibrator valve 327 and 329 has its anode 328, 330 returned, respectively, by means of a resistor 331 or 332 to a positive voltage potential; the said anodes 328 and 330 are also cross-connected by related coupling capacitors 333 and 334, to control electrodes 336 and 335, respectively. The control electrodes 335 and 336 are respectively returned to zero potential through resistors 337 and 338; the cathodes 339 and 340 are directly returned to zero potential.

The said multivibrator circuit develops an essentially square wave of a frequency determined by the capacitive and resistive values of the elements utilized. One of said multivibrator valves, being nonconductive, becomes conductive to transmit a negative impulse to the other multivibrator valve, causing it to become nonconductive. When this valve again becomes conductive, due to the "draining off" of said negative charge through a grid leak resistor, a negative impulse is passed to cut off the other conducting multivibrator valve. This sequence is followed at a given rate to generate a square wave which is delivered to the multivibrator coupling valve 319.

Figures 7, 8, 9:
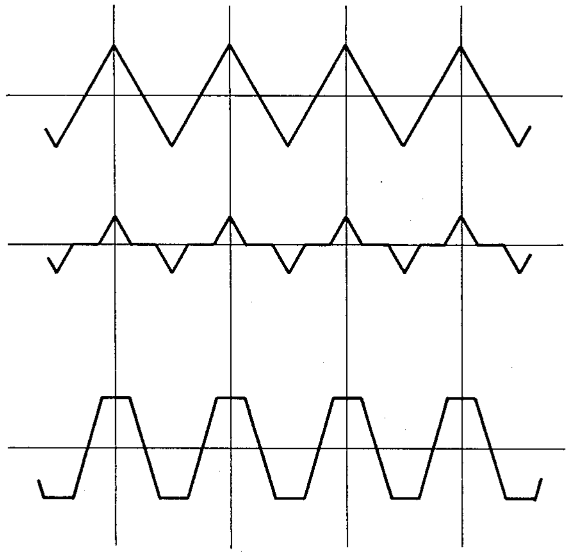

The said multivibrator coupling valve 319 is alternately driven to cutoff and saturation by the signal derived from said multivibrator circuit. This provides additional sharpening of the square wave developed in the multivibrator circuit. The output of said multivibrator coupling valve 319 is delivered to an integrating circuit comprised of the resistor 317 and the parallel capacitor resistor combination 316. By the process of integration, the square wave is converted to a triangular wave which appears on the control grid 358 of the signal integrating valve 313. The said triangular wave is amplified by the signal integrating valve 313, and delivered to the input winding 311 of the signal input transformer 310. FIGURE 7 graphically represents the idealized signal voltage across the input coil 311 of said signal input transformer 310.

One end of the secondary winding 312 of the signal input transformer 310 is connected through a limiting resistor 341 to the anode 345 of a limiting diode 343 and to the control electrode 351 of a signal output triode 349. The other end of said secondary winding 312 is likewise connected through a limiting resistor 342 to the anode 346 of a limiting diode 344 and to the signal electrode 352 of a signal output triode 350. The cathodes 348, 347, 358, 359, respectively, of the valves 344, 343, 349, and 350 are all directly returned to zero potential. The anodes 353 and 354 of triodes 349 and 350 are each respectively connected to the opposite end of the primary winding 356 of the signal output transformer 355, which has the center tap on its primary winding 356 returned to a positive potential, and its secondary winding 357 connected to the energizing coil 52 of the electromagnetic recording head 24.

The alternating signal appearing on the primary winding 311 of the signal input transformer 311 appear across the secondary winding 312, and is delivered 180 degrees out of phase to the anodes 345 and 346, respectively, of the limiting diodes 343 and 344 through limiting resistors 341 and 342, in addition to the signal voltage derived from the photocell coupling valve 302. By by-passing positive signals, the limiting diodes 343 and 344, respectively, prevent positive signals from appearing on the signal control electrodes 351 and 352 respectively of said signal output triodes 349 and 350. In some cases, limiting may be achieved without the use of said limiting diodes 343 and 344 because of the limiting properties of the triodes 349 and 350, due to conduction of the signal electrodes 351 and 352, when they become positive. It thus appears that the signal output from the signal output triodes 349 and 350 is restricted by the limited excursion of their respective control electrodes 351 and 352 which ranges from zero volts due to the limiting diodes 343 and 344 to values beyond the cutoff points of the valves 349 and 350. The actual excursion of the control electrodes 351 and 352, respectively, of the signal output triode 349 and 350 depends upon the amount of clipping of the triangular wave derived through the signal input transformer 310, which amount is determined by the value of positive voltage signal delivered to the tap of the secondary winding 312 by the photocell coupling 302. The greater the light intensity of an area scanned by the photocell 100, the higher will be the positive voltage delivered by the photocell coupling valve 302 to the center tap winding 312; this results in greater clipping of the triangular wave, a smaller excursion of the control electrodes 351 and 352, and a signal output at the transformer 355, similar to the graphic representation shown FIGURE 8. When the light intensity at the photocell 100 is relatively low, the voltage delivered by the photocell coupling valve 302 is less positive, resulting in less clipping of said triangular wave, giving a signal output at the transformer 305 similar to the graphic representation shown in FIGURE 9.

The tops and bottoms of the triangular wave represented in FIGURE 9 are flattened because the control electrodes 351 and 352 are, in this case, driven past the cutoff point of the valves 349 and 350 respectively. If the wave forms of FIGURES 8 and 9 are compared, it may be noted that, although the frequency in both cases is the same, the work cycle and amplitude of the wave form shown in FIGURE 9 corresponding to the scanning of a dark area by the photocell 100, is greater than that of the wave form shown in FIGURE 8, which corresponds to the scanning of an area of higher light intensity. Thus, by this means, a large gradation of light intensities are presented, not by increasing the frequency of the recording cycle, but by increasing the amplitude and recording work cycle of the magnetic recording signal.

Although the three electronic signal transforming circuits just described have all utilized photocells to derive signals of light intensity from a scanned body, it may be seen that signals may be derived from many other sources for recordation upon a magnetic printing cylinder utilizing the recording portion of the signal scanning unit shown in FIGURE 1. If necessary, synchronization between the recording signal and the driving motor may also be utilized, and might be obtained by use of a synchronizing signal occurring with the recording signal.

The magnetic printing unit illustrated by a diagrammatic view, partially in section, shown in FIGURE 10 is adapted to continuously print on a moving print-receiving strip by utilizing the magnetic printing cylinder 15 described earlier which is coupled to a driving motor 450, and has peripheral areas of selected magnetic polarization obtainable by treatment in the signal scanning unit of FIGURE 1 used in conjunction with an electronic signal transforming circuit, shown in FIGURES 4, 5, or 6.

The said magnetic printer unit contains a particle distributing mechanism 400 which may be secured by means of bolts 462 to a shelf 463 which is supported by a vertical back panel 464. A supporting bracket 465 which is also fixed to the shelf 460 bears a journal 466 at its upper end. Journal 466 receives one end of the axial shaft 45 of printing cylinder 15 providing a rotatable mounting. A second supporting bracket which may be identical to bracket 465 and also fixed to shelf 460 may be utilized to rotatably support cylinder 15 by retaining the other end of its shaft 45.

A motor 450 may also be supported upon the shelf 463 and arranged to drive the printing cylinder 15 by means of a coupling belt 451 which passes around a pulley wheel 452 attached to the shaft of the motor 450 and around a pulley wheel 453 fixed to the shaft 45 of cylinder 15.

The particle-distributing mechanism 400 has a suspension chamber 401 and a reservoir chamber 402 formed by a partitioning member 403 which provides a pressure safety gap 404 joining said chambers. The magnetic printing cylinder 15 is rotatably mounted upon its axis 45 so that a portion of its peripheral surface partially encloses said suspension chamber 401. A felt strip 405 which contacts the peripheral surface of said magnetic printing cylinder 15 provides an air seal; and said magnetic printing cylinder 15 is positioned to provide an air intake gap 406 at another place along its periphery. A baffling structure 407 within the suspension chamber 401 is positioned to form a circulating fluid path providing a tangential path along a portion of the peripheral surface of the magnetic printing cylinder 15 which forms an inside surface of the suspension chamber 401. A blower 411, connected to a blower motor 412, is located in the fluid circulating path within the suspension 401, so that its intake adjoins a low pressure side 409 and its outlet is adjoined to the high pressure side 408 of said suspension chamber 401. Two inspection windows 417 (one of which is shown) are located across from each other in the vertical walls of the suspension chamber 401 on the high pressure side 408.

The lower portion of said reservoir chamber 402 contains a powder-feeding worm 414 which is helically ridged and has its end portion extending through a feeding orifice 415 into the high pressure side 408 of said suspension chamber 401. Said powder-feeding worm 414, which is rotatably mounted, has its other end connected to a feed-driving motor 416. The upper portion 418 of said reservoir 402 is provided with an air vent 419 enclosed by a screen 420.

For operating purposes the reservoir chamber 402 at its bottom portion is supplied with a powder 413 which contains magnetically attractable particles which are delivered into the high pressure side 408 of the suspension chamber 401 by the rotating motion of the powder-feeding worm 414 activated by the feed-driving motor 416. The magnetically attractable particles may be made of a paramagnetic material such as iron which has been powdered. The blower motor 412 actuates the blower 411 to cause the building up of a high pressure at the blower output and a low pressure at the blower intake resulting in a fluid circulation as indicated by arrows in FIGURE 10.

Powder particles 421 deposited in the high pressure side 408 of the suspension chamber 401 are suspended in the air circulated by the blower 411 and traverse the fluid circulating path. The suspended particles passing through the tangential fluid path 410 are attracted to magnetically polarized areas of the magnetic printing cylinder 15 which is rotated by the driving motor 450 coupled to the axial shaft 45, thus allowing the sequential distribution of powder particles over the entire peripheral surface of said magnetic printing cylinder 15. The pressure safety gap 404 and the air vent 419 prevent the build-up of dangerously high pressures in the high pressure side 408 of the suspension chamber 401, by allowing a fluid escape path out of said chamber. The air vent screen 420 besides preventing the entry of outside impurities into the reservoir chamber, separates the suspended powder particles from the fluid escaping through the air vent 419, causing such powder particles to settle to the bottom of the reservoir chamber 419 for re-use by the feeding mechanism.

Air which is lost through the air vent 419 is replaced on the low pressure intake side 409 of the suspension chamber 401 by incoming air passing through the air intake gap 406. The air passing through the air intake gap 406 tangential to the peripheral surface of said magnetic printing cylinder 15 and in a direction opposite to the motion of said surface to which the suspended powder particles have been attracted, also serves the purpose of removing excess powder particles and cleaning surface areas not magnetically polarized.

The inspection windows 417 in the side walls of the suspension chamber 401 are adapted to cooperate with a fluid opacity measuring device used outside said suspension chamber 401. One such fluid opacity measuring device which is well known consists of a light source placed at one window 417 and a photoelectric cell placed at the other inspection window 417, so that the intensity of light received by the photoelectric cell is substantially proportional to the density of suspended powder particles in the circulating fluid found in the suspension chamber 401. When the fluid density falls below a given value said fluid density measuring device activates the feed-driving motor 416 causing the delivery of powder particles to the suspension chamber 401, raising the fluid density to a point where the said fluid density measuring device deactivates the feed-driving motor 416. By this method the density of suspended particles is maintained at values most satisfactory to the operation of the particle-distributing mechanism 400.

Reference to FIGURE 11 reveals the circuit of a fluid opacity responsive control device which may be used. A source of light, which may be an incandescent bulb 500, is positioned outside the device 400 in line with the inspection windows 417 of this device. A photoelectric cell 501 is positioned on the other side of the device 400 in line with the inspection windows 417 and adapted to receive light from the incandescent bulb 500, which passes through both inspection windows 417. It is obvious that the intensity of light from the source 500 falling upon the cathode of the photoelectric cell 501 is inversely related to the opacity of the fluid particles suspension contained within the chamber 401 of the device 400.

The anode of the photoelectric cell 501 is returned to positive voltage bus 50 while the cathode is returned to ground potential through a voltage divider 502. The adjustable arm of the voltage divider is linked to the control electrode of a relay actuating valve 503. Valve 503 has its cathode returned through a cathode resistor 504 to positive potential bus 10 and its anode returned to positive potential bus 100 through the energizing coil of a motor control relay 505. The movable contact arm of the motor control relay 505 is in a position contacting its left contact member when not energized. This movable contact arm, however, when actuated by its associated energizing coil contacts its right contacting member which is joined to a terminal 506. The terminals 506 and 507 are connected to an alternating current source of power. The terminal 507 is returned to ground potential.

The movable contact arm of motor control relay 505 is directly connected to a first winding 508 of the motor 416. The other end of winding 508 is returned to ground potential. A second winding 509 of the induction type motor 416 also has one end coupled to the movable contact arm of relay 505 through a phase shifting capacitor 510, while its other end is returned to ground potential.

In operation, when the fluid suspension in chamber 401 of the device 400 is sufficiently opaque, the low intensity of light arriving from the light source 500 upon the emitting cathode surface of photoelectric cell 501 makes the cell 501 only poorly conductive. The control voltage delivered to the valve 503 at this time is such that it is also maintained at a reduced conductivity. The reduced current flow through the energizing coil of relay 505 does not actuate relay contacts.

As the intensity of the light arriving upon the photoelectric cell 501 increases with reduction of particle density in the chamber 401, the voltage upon the control electrode of the valve 503 also increases, rendering it more conductive. When anode current is sufficiently increased through valve 503 and the energizing coil of relay 505, the movable contact arm of relay 505 is actuated to contact its right hand contacting member. This allows the delivery of mains power to the windings 508 and 509 of motor 416. The actuation of motor 416 causes delivery of additional particles to the chamber 401 increasing the opacity of the fluid therein. The continued operation of the motor 416 reduces the conductivity of photoelectric cell 501 and the control voltage delivered to valve 503. When the current delivered to the energizing coil of relay 505 has been sufficiently decreased, the movable contact arm returns to its deactivated position and cuts off power supply to the motor 416.

Thus, the upper and lower limits of the range within which the fluid opacity may vary are respectively determined by the drop-out current and the pull-in current of the energizing coil of motor control relay 505. Variations in the positions of the contact arm of the voltage divider 502 allow adjustment of the lower limit of fluid opacity by energizing the motor 416 when this limit is reached.

Referring again to FIGURE 10, a pressure roller 426 has an axial shaft 427, one end of which is rotatably supported in a bearing 470 which is mounted on the vertical back panel 464. The other end of the axial shaft 427 of pressure 426 may likewise be supported in a similar bearing mounted in a removable vertical front panel. This removable front panel may be secured to and held in spaced position with the said back panel 464 by means of four spacing brackets 471 which have one end anchored to the back panel 464 and are adapted to receive a bolt in their other extremity for fastening the front panel thereto. Thus, when the front panel is fixed in position, the pressure roller 426 is rotatably mounted and can be removed by detaching the front panel.

The pressure roller 426 tangentially contacts the peripheral surface of said magnetic printing cylinder 15. The said pressure roller 426 is adapted to receive a print-receiving strip 425 around a portion of its peripheral surface for the tangential contact of said print-receiving strip 425 with the powder-bearing surface of said magnetic printing cylinder 15. The pressure roller receives said strip 425 which passes over a guide roller 428 from a strip supply reel 429 which is connected to a tension motor (not shown). The other end of the print-receiving strip 425 passing around the pressure roller 426 moves over a guide roller 430 to a strip take-up reel 431 which is connected to a tensioning motor (not shown).

A scrub roller 436 has an axial shaft 435 and is also rotatably mounted by having one end of its axial shaft 435 supported by a bearing 472 mounted in the back vertical panel 464. The other end of the axial shaft 435 may be likewise supported in a bearing carried by the said front vertical panel.

The scrub roller 436 is rotatably mounted for tangential contact with the peripheral surface of the magnetic printing cylinder 15 at a place slightly removed from the said pressure roller 426 along the direction of rotation of said magnetic printing cylinder 15. An electro-magnet 437 has its poles in close proximity to a portion of the peripheral surface areas of said scrub roller 436. The said scrub roller 436 is connected to a rotating motor (not shown) which causes the contacting surface of said scrub roller 436 to move in a direction opposite to the direction of motion of the contacted peripheral surface of said magnetic printing cylinder 15.

To effect printing upon the print-receiving strip 425, the surface of the magnetic printing cylinder 15, which has been exposed to powder particles in the suspension chamber 401, revolves to tangentially contact the printing strip 425 backed by the pressure roller 426 which is caused to rotate due to the motion of the magnetic printing cylinder 15. Because of the rotation of the pressure roller 426, and because of the pressure which is exerted by it upon the magnetic printing cylinder 15 through the print-receiving strip 425, a satisfactory undistorted transfer of powdered particles to the surface of said magnetic printing cylinder 15 is achieved. It may be found desirable to spray the receiving strip 425 with a liquid by means of an atomizer 432 before contact is made with the magnetic printing cylinder 15 for the purpose of effecting a more complete transfer of powdered particles to the print-receiving strip 425.

The scrub roller 436 removes most of the powdered particles from the magnetic printing cylinder which have not been transferred to the print-receiving strip 425, thereby once more preparing the surface of said magnetic printing cylinder 15 for re-exposure in the suspension chamber 401 to allow a continuous printing process. The scrub roller electro-magnet 437 removes magnetically attractable particles from said scrub roller 436 allowing its efficient operation. The magnet 437 may be manually cleaned at intervals, or continuously cleaned by other means.

During the continuous printing operation, the print-receiving strip 425 is supplied by the reel 429 which is connected to a tensioning motor (not shown) to impose a given drag opposing the forward motion of said strip 425 which is imparted by the motion of the magnetic printing cylinder 15, to provide appropriate tensioning of the print-receiving strip 425. A tensioning motor (not shown) also powers the strip take-up reel 431 receiving the print-receiving strip 425 coming from the pressure roller 426, thereby tensioning the print-receiving strip 425 to prevent its slackening.

A strip heater 433 and an electromagnet 434 are positioned adjacent to the print-receiving strip 425 as it leaves the pressure roller 426, for the purpose of removing powdered particles, which were transferred earlier from the surface of the magnetic printing cylinder 15 to the print-receiving strip 425. This removal may be desired when said powdered particles have been reacted with a reagent sprayed by the atomizer 432 upon the print-receiving strip 425 which results in a coloration making the further presence of said powdered particles unnecessary and perhaps undesirable. For example, the reagent sprayed by atomizer 432 may be potassium ferricyanide, $K_3Fe(CN)_6$, or potassium ferrocyanide, $K_4Fe(CN)_6$, in a weak solution of hydrochloric acid (HCl) with a pH of from 2 to 4. When the magnetically attractable particles are powdered iron particles, reaction with the above said reagent produces a blue coloration at the point where the iron particle contacts the reagent treated information receiving strip 425. The particles may also be sprayed with the reagent after being received by the strip 425. In either case, the particles may be removed by magnet 434 after reacting with the reagent.

It is apparent, that the magnetic printing unit shown in FIGURE 10 may be modified to carry out the various processes described earlier by adding additional atomizers utilizing various spraying liquids and printing particles or by using a series of magnetic printing units to produce multicolored prints. Arrangements may further be made for the use of a liquid as the suspending medium for the particles within the suspension chamber 401.

The magnetic printing apparatus embodying this invention may be utilized as a blueprinting machine. In this case, a printing cylinder 15 of the material to be reproduced is prepared from the master copy as previously described utilizing the apparatus shown in FIGURE 1. The apparatus shown in FIGURE 10 is then employed to print as many copies of the original material as desired. In addition to all other forms of its utility, the apparatus may be utilized as a block printer to print a series of address blocks on the print-receiving strip 425. The individual address blocks are then separated by cutting and affixed to the object to be mailed. As a modification of this process, a web of transparent material coated on its outer side with an adhesive composition may be employed in place of the strip 425, the adhesive facing the drum 15. The particles are picked up from the drum by the adhesive surface, to form address blocks, which are then cut apart and affixed to the dispatched article by the same adhesive side. This process is especially valuable because of the ease with which the addresses recorded upon the magnetic printing cylinder 15 may be changed.

Refer now to FIGURE 12 which shows apparatus suitable for producing pigmented or dye-coated magnetically attractable powdered particles which may be used in the device shown in FIGURE 10. This apparatus may be comprised of a section of hollow tubing 600 preferably of an insulating material such as glass. The tubing 600 is formed to provide an elbow configuration and has a substantially horizontal section or arm 601 and a substantially vertical section or arm 602. The vertical section 602 of the tubing 600 may be connected with a substantially horizontal section of tubing 603 providing an exhaust tube for communicating with the hollow core of the tubing 600. The end of the vertical section 602 of the tubing 600 may be provided with a particle collecting pan 604.

A conventional fluid exhausting apparatus may be connected to the end of the exhaust tube 603 to draw a stream of air or other such gas or fluid to the right through the horizontal section 601 of the tubing 600, around the bend in the tubing and in a vertical direction down the section of the tubing 602 to the exhaust tube 603. When the flow of air reaches the exhaust tube 603, its motion is changed from the vertical direction to the horizontal direction. Thence, it passes along the exhaust tube 603 out of the apparatus.

A fluid ejecting nozzle 610 is centrally located within the opening of the tubing section 601 at its left extremity. The nozzle ejects fluid to the right through the tube 610 in the same direction with the stream of air passing through the tubing. The nozzle 610 is maintained in this position by a fluid supplying tube 611 which is appropriately fixed to the wall of the tubing 601 by an appropriate fitting 612 at the point at which it passes therethrough. The nozzle 610 as well as the communicating tubing, 611, is made of an electroconductive material. This allows the nozzle 610 to be maintained at a negative potential by connection to a terminal 613. An extension tube 614 connecting with tube 611 may provide the nozzle 610 with a supply of a pigment solution or dyeing fluid. For example, if it is desirable to coat particles with a water soluble dye, a water solution of Prussian blue, eosine (yellow) or fluorescein (green) may be used.

The dye solution may be drawn from the nozzle 610 by the reduced pressure caused by the flow of air past it, by maintaining a sufficient pressure head on the dyeing fluid by locating a fluid reservoir at a sufficient elevation above nozzle 610 or by any conventional pumping means.

A particle ejecting nozzle 615 is radially positioned by attachment to the wall of the section of tubing 601. The nozzle 615 is positioned to the right of nozzle 610 so that it ejects particles into the path of the dye mist from nozzle 610. Nozzle 615 is also composed of material which is electroconductive so that it may be maintained at a positive potential by connection to a terminal 616.

Further along the section of the tubing 601 to the right of nozzle 610 and 615 an induction heating coil 620 is wound around the outside of the tubing 601. The ends of the winding 620 are joined to terminals 621 supplied with radio frequency current.

The apparatus operates as follows to coat magnetically attractable particles. As already explained, a stream of air is drawn through the tube 600 past the centrally located nozzle 610 which emits a fine spray of pigment or dye fluid. Because the fluid sprayed from the nozzle 610 is negatively charged, a fine spray or mist is produced which has minute droplets all bearing the same charge. The similarly charged particles remain separated into fine particles because they repel each other.

The powder particles injected into the stream of dye-bearing mist are each charged positively by passing through the nozzle 615 connected to the positive terminal 616. These fine powder particles also tend to separate allowing each to be fully exposed to the dye mist. There is an attraction between the pigment or dye-bearing droplets and the powdered magnetizable particles because of the opposite charges upon each. This affinity provides means for efficiently and individually coating each of the powdered particles.

The coated particles pass to the right along the tube 601, carried along by the stream of air and pass through the section of the tubing surrounded by the induction heating coil 620. The conduction currents or eddy currents induced in the magnetically attractable particles, due to the radio frequency field produced by the coil 620, sufficiently heat each particle to dry its coating of dye or pigment. The coated particles, which are now dry, are deflected in a downward direction as they pass around the elbow in the tube 600. They continue in the downward direction until they are caught by the pan 604. These particles will not pass out through the exhaust tube 603 because their inertia resists deflection from the vertical to the horizontal direction. However, airborne substances, such as dye material not deposited in the above process on powdered particles, are of lesser mass than the powdered particles, and are drawn out through the exhaust tube 603. This means provides a suitable device for separating undesired substances from the coated powdered particles.

While this invention has been described and illustrated with reference to a specific embodiment, it is to be understood that the invention is capable of various modifications and applications, not departing essentially from the spirit thereof, which will become apparent to those skilled in the art.

What is claimed is:

1. In an apparatus utilizing magnetically attractable particles to transfer intelligence to a receiving strip, a cylindrical body having peripheral surface areas of selected magnetic polarization, a suspension chamber partially enclosed by a portion of the peripheral surface of said cylindrical body, a baffling structure forming a circulating fluid path within said suspension chamber tangential to a portion of the peripheral surface of said cylindrical body, a blower unit situated in the circulating fluid path formed by said baffling structure, a storage chamber situated adjacent to said suspension chamber adapted to store magnetically attractable particles, a feeding device comprising a driving motor and a feed worm situated in said storage chamber having one extremity protruding into said suspension chamber and the other extremity rotated by said driving motor, a density measuring apparatus responsive to fluid suspensions existing within said suspension chamber controlling the driving motor of said feeding device, a structure adapted to rotatably mount said cylindrical body for tangential contact of its peripheral surface areas with a continuously moving intelligence receiving strip, a pressure roller adapted to apply compressive force at the locations where said cylindrical body contacts said intelligence receiving strip, and a source of power rotating said cylindrical body.

2. In an apparatus utilizing magnetically attractable particles, a cylindrical body having peripheral surface areas of selected magnetic polarization, a suspension chamber partially enclosed by a portion of the peripheral surface of said cylindrical body, a baffling structure forming a circulating fluid path within said suspension chamber tangential to a portion of the peripheral surface of said cylindrical body, a blower unit situated in the circulating fluid path formed by said baffling structure, a reservoir member situated adjacent to said suspension chamber adapted to store magnetically attractable particles, a feeding device comprising a driving motor and a helically ridged rod situated in said reservoir member having one extremity protruding into said suspension chamber and the other extremity rotated by said driving motor, a density measuring apparatus responsive to fluid suspensions existing within said suspension chamber exciting the driving motor of said feeding device, a structure rotatably supporting said cylindrical body, and driving connection to said blower unit, said feeding device and said cylindrical body.

3. In a system for reproducing a visual record; a device for scanning the record comprising a photoelectric transducer, an electric signal generating network, a modulating network comprising a transformer and signal clipping devices, the primary of said transformer being connected to said signal generating network, an electromagnetic transducer for recording on a magnetic recording medium, means including said signal clipping devices coupling the secondary of said transformer to said electromagnetic transducer, and means coupling the output of said photoelectric transducer to said signal clipping devices to modulate the clipping threshold of said devices in accordance with said photoelectric transducer output.

4. A magnetic printer for reproducing copies of a visual record comprising, a photoelectric scanner for scanning the visual record to be reproduced and for producing electric signals characteristic of the visual record, a magnetizable member having a finite surface area, an electromagnetic transducer communicating with the surface of said magnetizable member and connected to receive the output of said photoelectric scanner, means for scanning the surface of said magnetizable member with said electromagnetic transducer in synchronism with the scanning action of said photoelectric scanner whereby a magnetic image of said visual record is traced out on the surface of said magnetizable member, a source of magnetically attractable powder, means for dusting the image bearing surface of said magnetizable member with said powder, a print receiving strip member, means for rolling said print receiving strip across the dusted image surface of said magnetizable member thereby to effect transfer of a visual image to the print receiving strip, and a liquid atomizer adapted to spray said print receiving member before it contacts said magnetizable member.

5. A magnetic printer for reproducing copies of a visual record comprising, a photoelectric scanner for scanning the visual record to be reproduced and for producing electric signals characteristic of the visual record, a magnetizable member having a finite surface area, an electromagnetic transducer communicating with the surface of said magnetizable member and connected to receive the output of said photoelectric scanner, means for scanning the surface of said magnetizable member with said electromagnetic transducer in synchronism with the scanning action of said photoelectric scanner whereby a magnetic image of said visual record is traced out on the surface of said magnetizable member, a source of magnetically attractable powder, means for dusting the image bearing surface of said magnetizable member with said powder, a print receiving strip member, means for rolling said print receiving strip across the dusted image surface of said magnetizable member thereby to effect transfer of a visual image to the print receiving strip, and a magnetic stripping device for removing excess magnetic powder from said print receiving strip after it has contacted said magnetizable member.

6. In an apparatus utilizing magnetically attractable particles to transfer intelligence to a receiving strip, a body having peripheral surface areas of selected magnetic polarization, a suspension chamber partially enclosed by a portion of the peripheral surface of said body, a baffling structure forming a circulating fluid path within said suspension chamber tangential to a portion of the peripheral surface of said body, a blower unit situated in the circulating fluid path formed by said baffling structure, a storage chamber situated adjacent to said suspension chamber adapted to store magnetically attractable particles, a feeding device comprising a driving motor and a feed worm situated in said storage chamber having one extremity protruding into said suspension chamber and the other extremity rotated by said driving motor, a density measuring apparatus responsive to fluid suspensions existing within said suspension chamber controlling the driving motor of said feeding device, a structure adapted to mount said body for tangential contact of its peripheral surface areas with a continuously moving intelligence receiving strip, and a pressure roller adapted to apply compressive force at the locations where said body contacts said intelligence receiving strip.

7. In an apparatus utilizing magnetically attractable particles, a body having peripheral surface areas of selected magnetic polarization, a suspension chamber partially enclosed by a portion of the peripheral surface of said body, a baffling structure forming a circulating fluid path within said suspension chamber tangential to a portion of the peripheral surface of said cylindrical body, a blower unit situated in the circulating fluid path formed by said baffling structure, a reservoir member situated adjacent to said suspension chamber adapted to store magnetically attractable particles, a feeding device comprising a driving motor and a helically ridged rod situated in said reservoir member having one extremity protruding into said suspension chamber and the other extremity rotated by said driving motor, a density measuring apparatus responsive to fluid suspensions existing within said suspension chamber for exciting the driving motor of said feeding device, a structure supporting said cylindrical body, and driving connection to said blower unit, said feeding device and said body.

8. A magnetic printer for reproducing copies of a visual record comprising a photoelectric scanner for scanning the visual record to be reproduced and for producing electric signals characteristic of the visual record, a magnetizable member having a finite surface area, an electromagnetic transducer communicating with the surface of said magnetizable member and connected to receive the output of said photoelectric scanner, means for scanning the surface of said magnetizable member with said electromagnetic transducer in synchronism with the scanning action of said photoelectric scanner whereby a magnetic image of said visual record is traced out on the surface of said magnetizable member, means for dusting the image bearing surface of said magnetizable member with magnetically attractable powder, means for rolling a print receiving strip member across the dusted image surface of said magnetizable member thereby to effect transfer of a visual image to the print receiving strip, and a liquid atomizer adapted to spray said print receiving member before it contacts said magnetizable member.

9. A magnetic printer for reproducing copies of a visual record comprising a photoelectric scanner for scanning the visual record to be reproduced and for producing electric signals characteristic of the visual record, a magnetizable member having a finite surface area, an electromagnetic transducer communicating with the surface of said magnetizable member and connected to receive the output of said photoelectric scanner, means for scanning the surface of said magnetizable member with said electromagnetic transducer in synchronism with the scanning action of said photoelectric scanner whereby a magnetic image of said visual record is traced out on the surface of said magnetizable member, means for dusting the image bearing surface of said magnetizable member with magnetically attractable powder, means for rolling a print receiving strip member across the dusted image surface of said magnetizable member thereby to effect transfer of a visual image to the print receiving strip member, and a magnetic stripping device for removing excess magnetic powder from said print receiving strip after it has contacted said magnetizable member.

10. A magnetic printer for reproducing copies of a visual record comprising a photoelectric scanner for scanning the visual record to be reproduced and for producing electric signals characteristic of the visual record, a magnetizable member having a finite surface area, an electromagnetic transducer communicating with the surface of said magnetizable member and connected to receive the output of said photoelectric scanner, means for scanning the surface of said magnetizable member with said electromagnetic transducer in synchronism with the scanning action of said photoelectric scanner whereby a magnetic image of said visual record is traced out on the surface of said magnetizable member, means for dusting the image bearing surface of said magnetizable member with magnetically attractable powder, means for rolling a print receiving strip member across the dusted image surface of said magnetizable member thereby to effect transfer of a visual image to the print receiving strip, a magnetic stripping device for removing excess magnetic powder from said print receiving strip after it has contacted said magnetizable member, and a liquid atomizer adapted to spray said print receiving member before it contacts said magnetizable member.

11. A magnetic printer comprising means for producing electric signals characteristic of the information to be reproduced, a magnetizable member having a finite surface area, an electromagnetic transducer communicating with the surface of said magnetizable member and connected to receive said electric signals, means for scanning the surface of said magnetizable member with said electromagnetic transducer whereby a magnetic image of the information to be reproduced is traced out on the surface of said magnetizable member, means for dusting the image bearing surface of said magnetizable member with magnetically attractable powder, means for rolling a print receiving strip member across the dusted image surface of said magnetizable member thereby to effect transfer of a visual image to the print receiving strip, and a liquid atomizer adapted to spray said print receiving member before it contacts said magnetizable member.

12. A magnetic printer comprising means for producing electric signals characteristic of the information to be reproduced, a magnetizable member having a finite surface area, an electromagnetic transducer communicating with the surface of said magnetizable member and connected to receive said electric signals, means for scanning the surface of said magnetizable member with said electromagnetic transducer whereby a magnetic image of the information to be reproduced is traced out on the surface of said magnetizable member, means for dusting the image bearing surface of said magnetizable member with magnetically attractable powder, means for rolling a print receiving strip member across the dusted image surface of said magnetizable member thereby to effect transfer of a visual image to the print receiving strip member, and a magnetic stripping device for removing excess magnetic powder from said print receiving strip after it has contacted said magnetizable member.

13. A magnetic printer comprising means for producing electric signals characteristic of the information to be reproduced, a magnetizable member having a finite surface area, an electromagnetic transducer communicating with the surface of said magnetizable member and connected to receive said electric signals, means for scanning the surface of said magnetizable member with said electromagnetic transducer whereby a magnetic image of the information to be reproduced is traced out on the surface of said magnetizable member, means for dusting the image bearing surface of said magnetizable member with magnetically attractable powder, means for rolling a print receiving strip member across the dusted image surface of said magnetizable member thereby to effect transfer of a visual image to the print receiving strip, a magnetic stripping device for removing excess magnetic powder from said print receiving strip after it has contacted said magnetizable member, and a liquid atomizer adapted to spray said print receiving member before it contacts said magnetizable member.

No references cited.